(12) United States Patent
Oh et al.

(10) Patent No.: US 11,646,409 B2
(45) Date of Patent: May 9, 2023

(54) CATHODE ACTIVE MATERIAL FOR LITHIUM SECONDARY BATTERY, CATHODE AND LITHIUM SECONDARY BATTERY COMPRISING SAME, AND MANUFACTURING METHOD THEREOF

(71) Applicants: Hyundai Motor Company, Seoul (KR); Kia Motors Corporation, Seoul (KR)

(72) Inventors: Seung-Min Oh, Incheon (KR); KiSeok Koh, Gyeonggi-do (KR); Yeolmae Yeo, Gyeonggi-do (KR); Yoon Sung Lee, Gyeonggi-do (KR); Jieun Lee, Gyeonggi-do (KR); Dongjun Kim, Gyeonggi-do (KR); Sang Mok Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 328 days.

(21) Appl. No.: 16/579,031

(22) Filed: Sep. 23, 2019

(65) Prior Publication Data
US 2020/0194783 A1    Jun. 18, 2020

(30) Foreign Application Priority Data
Dec. 13, 2018 (KR) .......................... 10-2018-0161202

(51) Int. Cl.
*H01M 4/00* (2006.01)
*H01M 4/36* (2006.01)
(Continued)

(52) U.S. Cl.
CPC .......... *H01M 4/366* (2013.01); *H01M 4/485* (2013.01); *H01M 4/628* (2013.01);
(Continued)

(58) Field of Classification Search
CPC .. H01M 4/366; H01M 10/0525; H01M 4/485; H01M 10/4235; H01M 4/628; H01M 2004/021; H01M 2004/028; H01M 4/0471; H01M 4/1391; H01M 4/62; H01M 4/525; H01M 10/058; H01M 10/052; Y02P 70/50; Y02E 60/10; C01G 53/50; C01G 3/12; C01P 2004/80; C01P 2002/72; C01P 2002/77; C01P 2004/03; C01P 2002/85; C01P 2006/40
See application file for complete search history.

(56) References Cited

U.S. PATENT DOCUMENTS

| 2011/0195315 A1* | 8/2011 | Tsuchida ............. H01M 10/058 429/319 |
| 2014/0287324 A1* | 9/2014 | Tsuchida ................. H01M 4/62 429/304 |

(Continued)

*Primary Examiner* — Nicholas P D'Aniello
(74) *Attorney, Agent, or Firm* — Fox Rothschild LLP

(57) ABSTRACT

Provided are a cathode active material for a lithium secondary battery, a cathode and a lithium secondary battery each including the same, and a method of manufacturing the same. The cathode active material for a lithium secondary battery includes a core including a lithium metal oxide and a coating layer formed on a surface and the inner grain boundaries of the core, wherein the coating layer includes a metal sulfide.

8 Claims, 14 Drawing Sheets

(51) Int. Cl.
    *H01M 10/0525*    (2010.01)
    *H01M 4/485*      (2010.01)
    *H01M 10/42*     (2006.01)
    *H01M 4/62*       (2006.01)
    *H01M 4/02*       (2006.01)

(52) U.S. Cl.
    CPC ... *H01M 10/0525* (2013.01); *H01M 10/4235* (2013.01); *H01M 2004/021* (2013.01); *H01M 2004/028* (2013.01)

(56) References Cited

U.S. PATENT DOCUMENTS

2017/0250407 A1*   8/2017   Iwasaki ................. H01M 4/485
2017/0338471 A1*  11/2017   Zheng .................. H01M 4/505

\* cited by examiner

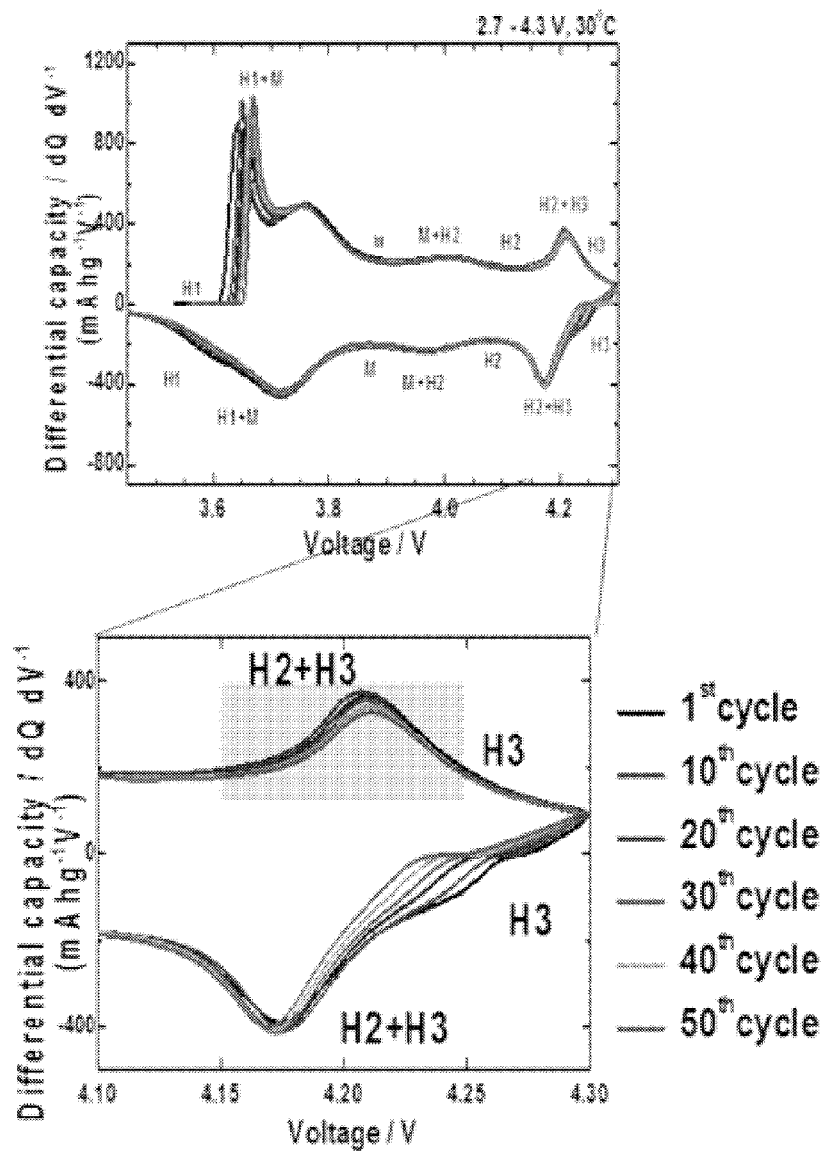

CATHODE ACTIVE MATERIAL FOR LITHIUM SECONDARY BATTERY, CATHODE AND LITHIUM SECONDARY BATTERY COMPRISING SAME, AND MANUFACTURING METHOD THEREOF

CROSS-REFERENCE TO RELATED APPLICATION(S)

This application claims the benefit of priority to Korean Patent Application No. 10-2018-0161202 filed on Dec. 13, 2018 in the Korean Intellectual Property Office, the entire disclosure of which is incorporated herein by reference.

TECHNICAL FIELD

The present invention relates to a cathode active material for a lithium secondary battery, a cathode and a lithium secondary battery each including the same, and a method of manufacturing the same. The cathode active material for a lithium secondary battery may prevent the lifetime of the lithium secondary battery from deteriorating.

BACKGROUND

In the related art, surface modification of a cathode active material has been mainly based on water-based coating using distilled water and a solvent. However, a cathode active material having a high nickel content is vulnerable to moisture and deteriorates in distilled water and other solvents. Therefore, it is difficult to apply a conventional water-based coating to surface modification of a cathode active material having a high nickel content.

The cathode active material having a high nickel content used for a high capacity lithium secondary battery has a problem of side reaction with an electrolyte due to highly reactive For example, $Ni^{4+}$ present on the surface of the cathode active material and sudden change of a lattice caused by phase changes during charging/discharging.

Accordingly, in the related art, a method of coating the cathode active material with a stable material on the surface thereof in the form of islands has been used. However, sudden change of the lattice occurred in the charging/discharging process causes cracks in crystals. As a result, there is still a problem that the electrolyte penetrates into the particles, causing deterioration of the inner grain boundaries, resulting in rapid deterioration of lifetime characteristics.

Therefore, it is required to improve the lifetime characteristics of the cathode active material having a high nickel content by suppressing side reactions with the electrolyte penetrating into the grain boundaries and cracks.

SUMMARY

In preferred aspects, provided are a cathode active material for a lithium secondary battery having improved lifetime characteristics by suppressing side reactions with an electrolyte penetrating along grain boundaries and cracks of the cathode active material, a cathode and a lithium secondary battery each including the same, and a manufacturing method thereof.

In one aspect, provided is a cathode active material for a lithium secondary battery that may include a core including a lithium metal oxide and a coating formed on a surface and inner grain boundaries of the core. Preferably, the coating layer may include a metal sulfide.

The term "lithium metal oxide" as used herein refers to a compound or material including a lithium component (e.g., element or cation thereof), other metal component (e.g., cationic form of alkali metal, alkali earth metal, or transition metal) or a cation thereof, and an oxide ($O^{2-}$). The lithium metal oxide may further include non-metallic elements or ions (e.g., anions) thereof such as O, N, halogen (e.g. F), S and P. Preferably, the metal component in the lithium metal oxide may suitably include one or more transition metal, or cations thereof.

The term "metal sulfide" as used herein refers to a compound or material including a metal component (e.g., cationic form of alkali metal, alkali earth metal, or transition metal) or a cation thereof and a sulfide ($S^{2-}$). Preferably, the metal component in the metal sulfide may suitably include one or more transition metal, or cations thereof.

The term "inner grain boundaries" as used herein refers to an interface between two grains, or crystallites, in a polycrystalline material (e.g., lithium metal oxide in the core).

For example, the metal sulfide may suitably include a sulfide ($S^{2-}$) of at least one metal selected from the group consisting of Ni, Co, Ti, Fe, Mn, V, Cu, Zr, Zn, Al, As, Mo and W.

The coating layer may suitably include the metal sulfide in an amount of about 0.5 to 2 mol % based on the total mol number of the cathode active material.

The lithium metal oxide may be represented by $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xN_{1-y-z}Co_yM'_zA_\alpha$, $Li_xNi_{1-y-z}Co_yM'_zO_{2-\alpha}X_\alpha$, $Li_xN_{1-y-z}Mn_yM'_zA_\alpha$, and $Li_xNi_{1-y-z}Mn_yM'_zO_{2-\alpha}X_\alpha$ (where $0.95 \leq x \leq 1.1$, $0 \leq y \leq 0.5$, $0 \leq z \leq 0.5$, and $0 < \alpha \leq 2$), wherein, M' is at least one element selected from the group consisting of Al, Ni, Co, Mn, Cr, Fe, Mg, Sr, V, Ru, Sn, Ti, As, Mo or a rare earth element, A is an element selected from the group consisting of O, F, S and P, and X is an element selected from the group consisting of F, S and P.

The cathode active material may suitably have a particle size of about 3 to 20 μm.

In another aspect, provided is a lithium secondary battery that may include a cathode including a cathode active material as described herein. Preferably, the cathode active material may include a core which may include a lithium metal oxide and a coating layer formed on a surface and inner boundaries of the core. The coating layer may suitably include a metal sulfide, an anode and an electrolyte. For example, the coating layer may be formed on the core by dry coating.

In further aspect, provided is a method of manufacturing a cathode active material for a lithium secondary battery. The method may include preparing an admixture including a metal sulfide with a core including a lithium metal oxide and forming a metal sulfide coating layer on a surface and inner grain boundaries of the core by heating the admixture. Preferably, the admixture may be prepared by dry mixing the metal sulfide with the core including the lithium metal oxide.

For example, the dry mixing may include at least one selected from the group consisting of a planetary ball mill method, a low speed ball mill method, a high speed ball mill method, a hybridization method and a mechanofusion method.

The metal sulfide coating layer may suitably include the metal sulfide in an amount of about 0.5 to 2 mol % based on the total mol number of the cathode active material.

Preferably, the heating may be performed at a temperature of about 350 to 450° C.

The lithium metal oxide may suitably include one or more selected from the group consisting of $Li_xM_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ (where $0.95 \leq x \leq 1.1$, $0 \leq y \leq 0.5$, $0 \leq z \leq 0.5$, and $0 < \alpha \leq 2$), wherein, M' is one or more elements selected from the group consisting of Al, Ni, Co, Mn, Cr, Fe, Mg, Sr, V, Ru, Sn, Ti, As, Mo or a rare earth element, A is an element selected from the group consisting of O, F, S and P, and X is an element selected from the group consisting of F, S and P.

Preferably, the admixture may suitably be formed to have a particle size of about 3 to 20 μm.

Preferably, the coating layer (e.g., metal sulfide coating layer) may be formed on the core by dry coating.

In addition, the coating layer (e.g., metal sulfide coating layer) may be formed not only on the surface of the core but also on the inner grain boundaries of the core to suppress side reactions between the cathode active material and the electrolyte, thereby improving lifetime characteristics of a battery.

Other aspects of the invention are disclosed infra.

BRIEF DESCRIPTION OF DRAWINGS

FIGS. 4A, 4B, and 4C are graphs showing cell performance measured in the presence and absence of an exemplary coating layer.

DETAILED DESCRIPTION

Figure 1:
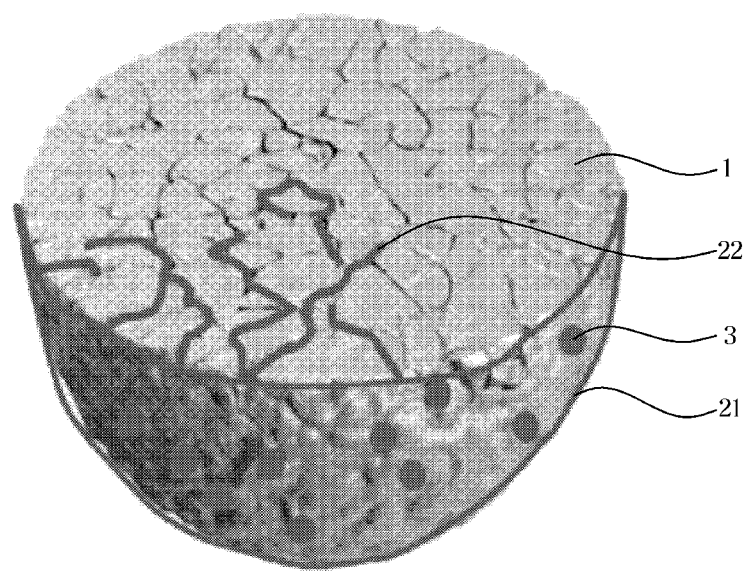
FIG. 1 shows an exemplary cathode active material for an exemplary lithium secondary battery according to an exemplary embodiment of the present invention.

A cathode active material for a lithium secondary battery according to an embodiment of the present invention may include a core including a lithium metal oxide and a coating layer formed on the surface and inner grain boundaries of the core, and the coating layer may include a metal sulfide Hereinafter, preferred embodiments of the present invention will be described. However, the embodiments of the present invention may be modified into various other forms, and the technical idea of the present invention is not limited to the embodiments described below. Further, the embodiments of the present invention are provided to more fully explain the present invention to those skilled in the art.

The terms used in the present application are used only to illustrate specific examples. Thus, for example, the expression of the singular includes plural expressions unless the context clearly dictates otherwise. In addition, the terms "include" or "have," and the like used in the present application are used to specifically denote the presence of stated features, steps, functions, elements, or combinations thereof and the like, and are not used to preparatorily preclude the presence of elements, steps, functions, components, or combinations thereof.

Unless defined otherwise, all terms used herein should be interpreted to have the same meaning as commonly understood by one of ordinary skill in the art to which this invention belongs. Thus, unless explicitly defined herein, certain terms should not be construed in an overly ideal or formal sense.

It should also be understood that the terms "about," "substantially," and the like in the present specification are used in the numerical value or in the vicinity of the numerical value in the meanings mentioned when inherent manufacturing and material allowable errors are presented, and are used to prevent conscienceless intruders from unreasonably using the accurate or absolute numbers, disclosed in the present invention to help understanding of the present invention Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As discussed above, a conventional cathode active material having a high nickel content is vulnerable to moisture and deteriorates in distilled water and other solvents, it is difficult to apply conventional water-based coating to surface modification of the cathode active material having a high nickel content.

Also, the cathode active material having a high nickel content used for a high capacity lithium secondary battery has a problem of side reaction with an electrolyte due to highly reactive $Ni^{4+}$ present on the surface of the cathode active material and sudden change of the lattice caused by phase changes during charging/discharging.

In order to solve the above problems, the present invention provides a cathode active material for a lithium secondary battery having improved lifetime characteristics by suppressing side reactions with an electrolyte penetrating along the grain boundaries and cracks of the cathode active material, a cathode and a lithium secondary battery each including the same, and a manufacturing method thereof.

In an aspect, a cathode active material may include a core including a lithium metal oxide and a coating layer formed on a surface and inner grain boundaries of the core, and the coating layer may include a metal sulfide.

Hereinafter, embodiments of the present invention will be described in detail with reference to the accompanying drawings. As shown in FIG. 1, a lithium metal oxide-containing core 1, a coating layer 21 formed on a surface of the core 1, and a coating layer 22 formed on inner grain boundaries of the core 1, which are included in a cathode active material for a lithium secondary battery according to an embodiment of the present invention, are shown. Hereinafter, each component will be described.

Core

In the present invention, the core is one of the components in which lithium is reversibly intercalated and deintercalated by charging/discharging and is a main component of the cathode active material of the present invention.

The core may suitably include a lithium metal oxide. The lithium metal oxide may suitably include lithium and an oxide of a metal including lithium. For example, the lithium metal oxide is represented by one of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ (where $0.95 \leq x \leq 1.1$, $0 \leq y \leq 0.5$, $0 \leq z \leq 0.5$, and $0 < \alpha \leq 2$). M' is at least one element selected from the group consisting of Al, Ni, Co, Mn, Cr, Fe, Mg, Sr, V, Ru, Sn, Ti, As, Mo or a rare earth element, A is an element selected from the group consisting of O, F, S and P, and X is an element selected from the group consisting of F, S and P.

In the related art, a core has a problem of side reaction with the electrolyte due to highly reactive $Ni^{4+}$ present on the surface of the cathode active material and sudden change of the lattice caused by phase changes during charging/discharging. Accordingly, in the present invention, a coating layer may be formed on the surface and the inner grain boundaries of the core, thereby preventing the electrolyte from contacting the surface by the coating layer formed on the core surface and preventing the electrolyte from penetrating into the core through cracks caused by abrupt changes of the inner lattice of the core during the repetitive charging/discharging processes. Thus, the side reaction between the core and the electrolyte may be prevented. Hereinafter, the coating layer which is a constitution for suppressing the side reaction between the core and the electrolyte will be described.

Coating Layer

The coating layer may be one of the components that may suppress side reactions between the core and the electrolyte and may be formed on the core surface and the core inner grain boundaries. In particular, as shown in FIG. 1, the coating layer may be formed on the core surface and the core inner grain boundaries.

Since a metal oxide has a high melting point, it is difficult to form a coating layer of the metal oxide on the surface and the inner grain boundaries, and a metal halide is difficult to manufacture and low in stability. Thus, the coating layer according to an exemplary embodiment of the present invention may include a metal sulfide. The type of the metal is not particularly limited as long as the metal sulfide according to an exemplary embodiment of the present invention has no problem in terms of electrochemical characteristics. Preferably, the metal may suitably include at least one metal selected from the group consisting of Ni, Co, Ti, Fe, Mn, V, Cu, Zr, Zn, Al, As, Mo and W.

The coating layer of the present invention may be formed not only on the surface of the core but also on the inner grain boundaries of the core to inhibit penetration of the electrolyte thereby suppressing side reactions between the core and the electrolyte. For this purpose, the metal sulfide may be easily able to penetrate pores of the core easily to form a coating layer on the core inner grain boundaries. Considering the grain size and the like in this respect, the metal sulfide may be preferably selected from the group consisting of Cu and mixtures thereof.

According to an exemplary embodiment, the metal sulfide of the present invention may be contained in an amount of about 0.5 to 2 mol % based on the total mol number of the cathode active material. When the content of the metal sulfide is less than about 0.5 mol %, a coated area becomes narrow and the side reaction between the core and the electrolyte may not be sufficiently suppressed. When the amount of the metal sulfide is greater than about 2 mol %, reversible intercalation and deintercalation of lithium may be hindered, and the effect of suppressing the side reaction by the coating layer is saturated.

More preferably, the metal sulfide of the present invention may be contained in an amount of about 1 mol % based on the total mol number of the cathode active material. In the above molar percentage (mol %) range, it is possible to perform reversible intercalation and deintercalation of lithium smoothly while sufficiently suppressing the side reaction between the core and the electrolyte, thereby improving lifetime characteristics of the battery.

As described above, the coating layer in the present invention may effectively suppress the side reaction between the core and the electrolyte, thereby obtaining excellent lifetime characteristics of the battery.

Cathode Active Material

The cathode active material for a lithium secondary battery according to an exemplary embodiment of the present invention may include a core including a lithium metal oxide and a coating layer formed on the surface and the inner grain boundaries of the core. Preferably, the coating layer may include a metal sulfide. There is no other particular limitation constitution thereof.

Preferably, the cathode active material of the present invention may suitably have a particle size of 3 to 20 μm.

As shown in FIG. 1, the cathode active material according to an exemplary embodiment of the present invention will be described. The cathode active material according to an exemplary embodiment of the present invention may include a coating layer 21 formed on the surface of the core 1 in which lithium is reversibly intercalated and deintercalated upon charging and discharging, and a coating layer 22 formed on the inner grain boundaries, to prevent infiltration of the electrolyte, thereby suppressing the side reaction between the core 1 and the electrolyte. At this time, the coating layer 22 may be suitably formed on the inner grain boundaries of the core by penetration of the metal sulfide through the pores 3 of the core 1.

Accordingly, the cathode active material of the present invention may effectively suppress the side reaction between the core and the electrolyte by forming a coating layer on both the surface and the inner grain boundaries of the core, thereby securing excellent lifetime characteristics of the cell.

Cathode for Lithium Secondary Battery and Lithium Secondary Battery

A cathode for a lithium secondary battery according to an exemplary embodiment of the present invention is not particularly limited as long as the cathode includes the cathode active material. In addition, any configuration changeable by any person skilled in the art may be included in the lithium secondary battery of the present invention, and the description thereof will be omitted.

Hereinafter, a method of manufacturing a cathode active material for a lithium secondary battery according to an exemplary embodiment of the present invention will be described in detail.

A method of manufacturing a cathode active material for a lithium secondary battery according to an exemplary embodiment of the present invention may include dry mixing a metal sulfide with a core including lithium metal oxide to prepare a mixture and forming a metal sulfide coating layer on a surface and inner grain boundaries of the core by heating the admixture. Each step will be described in detail below.

Dry Mixing Metal Sulfide with Core Including Lithium Metal Oxide

According to an exemplary embodiment of the present invention, preparing an admixture including the metal sulfide and the core including the lithium metal oxide may be suitably performed as a step of forming a coating layer of the metal sulfide on the surface of the core by dry mixing the metal sulfide with the core including the lithium metal oxide. The core and the metal sulfide have been described above and descriptions thereof will be omitted.

The step of dry mixing the metal sulfide with the core including the lithium metal oxide is not particularly limited as long as a coating layer is formed on the surface of the core by mixing the core and the metal sulfide. However, because a cathode active material having a high nickel content is vulnerable to moisture, surface modification with water-based coating is difficult. Therefore, the dry mixing may be preferably used to prepare the admixture including the metal sulfide and the core including the lithium metal oxide.

According to an exemplary embodiment of the present invention, the dry mixing may include at least one selected from the group consisting of a planetary ball mill method, a low speed ball mill method, a high speed ball mill method, a hybridization method and a mechanofusion method.

For example, in the mechanofusion method, the admixture is charged into a rotating container, and the admixture is fixed to the inner wall of the container by a centrifugal force, and then compressed into a gap between the inner wall of the container and an adjacent arm head at a slight interval.

According to an exemplary embodiment of the present invention, the mechanofusion method may be preferably used as a dry mixing method. According to the mechanofusion method, mixing may be performed at a higher speed than other dry mixing methods and a uniform coating may be formed on the surface of the core. Also, since no balls or blades are used, the metal sulfide may be coated on the surface of the core without breaking the core or damaging the surface.

In the mechanofusion method according to an admixture embodiment of the present invention, the metal sulfide may be attached to the surface of the core to bond the core to the metal sulfide, and at the same time, the metal sulfide of the surface of the core may be mechanically bonded by the stress accompanying the metal sulfide to form a coating layer. Further, the coating layer formed of the metal sulfide on the surface of the core may be softened or melted and bonded by heat generated from the accompanying stress.

The method may further include heat-treating the mixture, after dry mixing the metal sulfide with the core to form the metal sulfide coating layer on the surface of the core. By the heat-treating, the previously formed coating layer may be further strengthened and the metal sulfide may be diffused into the core to form a coating layer on the inner grain boundaries and cracks of the core. Hereinafter, the heat-treating will be described in detail.

Forming Metal Sulfide Coating Layer on Surface and Inner Grain Boundaries of Core by Heating Mixture The heat-treating of the metal sulfide coating layer to form the coating layer on the surface and the inner grain boundaries of the core according to an exemplary embodiment of the present invention may be a step of further strengthening the coating layer which is already formed on the surface of the core by dry mixing the metal sulfide with the core, and forming a coating layer on the inner grain boundaries of the core and the cracks by heating the metal sulfide to diffuse in a partially or entirely molten state.

The heating conditions in this step may be any conditions that may melt a part of or the entire the coating layer and are not particularly limited. However, it is preferable that the heating conditions do not exceed an initial firing temperature of the core, more preferably at a temperature of about 350 to 450° C.

In this step, the coating layer may be formed not only on the outer surface of the core but also on inner grain boundaries of the core by the metal sulfide diffused to the inner grain boundaries of the core to prevent the electrolyte from penetrating into cracks in the core, thereby suppressing side reactions between the core and the electrolyte. As such, excellent lifetime characteristics of the cell may be secured.

Hereinafter, the present invention will be described more specifically by way of examples. It should be noted, however, that the following examples are intended to illustrate the invention in more detail and not to limit the scope of the invention. The scope of the present invention is determined by the matters set forth in the claims and the matters reasonably inferred therefrom.

EXAMPLES

Hereinafter, the manufacturing process of each of examples and comparative examples will be described, and then the examples and comparative example will be compared and evaluated with reference to the accompanying drawings.

Preparation of Example 1

A core ($Li[Ni_{0.83}Co_{0.10}Mn_{0.07}]O_2$) and 1 mol % copper sulfide (CuS) were mixed using a nobilta. The mixing was carried out at 3000 RPM for 5 minutes. An mixed intermediate was obtained and heated at a temperature of 400° C. for 5 hours using a crucible made of alumina to prepare a cathode active material for a lithium secondary battery. At this time, the heating was carried out in a high purity oxygen atmosphere, and the temperature increase rate and the temperature decrease rate were set to 2° C./min.

Preparation of Comparative Example 1

In Comparative Example 1, a cathode active material for a lithium secondary battery was prepared using only a core ($Li[Ni_{0.83}Co_{0.10}Mn_{0.07}]O_2$) without forming a coating layer.

Preparation of Comparative Example 2

A cathode active material for a lithium secondary battery was prepared in the same manner as in Example 1, except that the heating was carried out at a temperature of 500° C. for 5 hours.

Preparation of Comparative Example 3

A cathode active material for a lithium secondary battery was prepared in the same manner as in Example 1, except that the heating was carried out at a temperature of 550° C. for 5 hours.

Preparation of Comparative Example 4

A cathode active material for a lithium secondary battery was prepared in the same manner as in Example 1, except that the core ($Li[Ni_{0.83}Co_{0.10}Mn_{0.07}]O_2$) and 0.5 mol % copper sulfide (CuS) were mixed using a nobilta Preparation of Comparative Example 5

A cathode active material for a lithium secondary battery was prepared in the same manner as in Example 1, except that the core ($Li[Ni_{0.83}Co_{0.10}Mn_{0.07}]O_2$) and 2 mol % copper sulfide (CuS) were mixed using a nobilta <Evaluation>

(1) Formation of Coating Layer

Figure 2A:
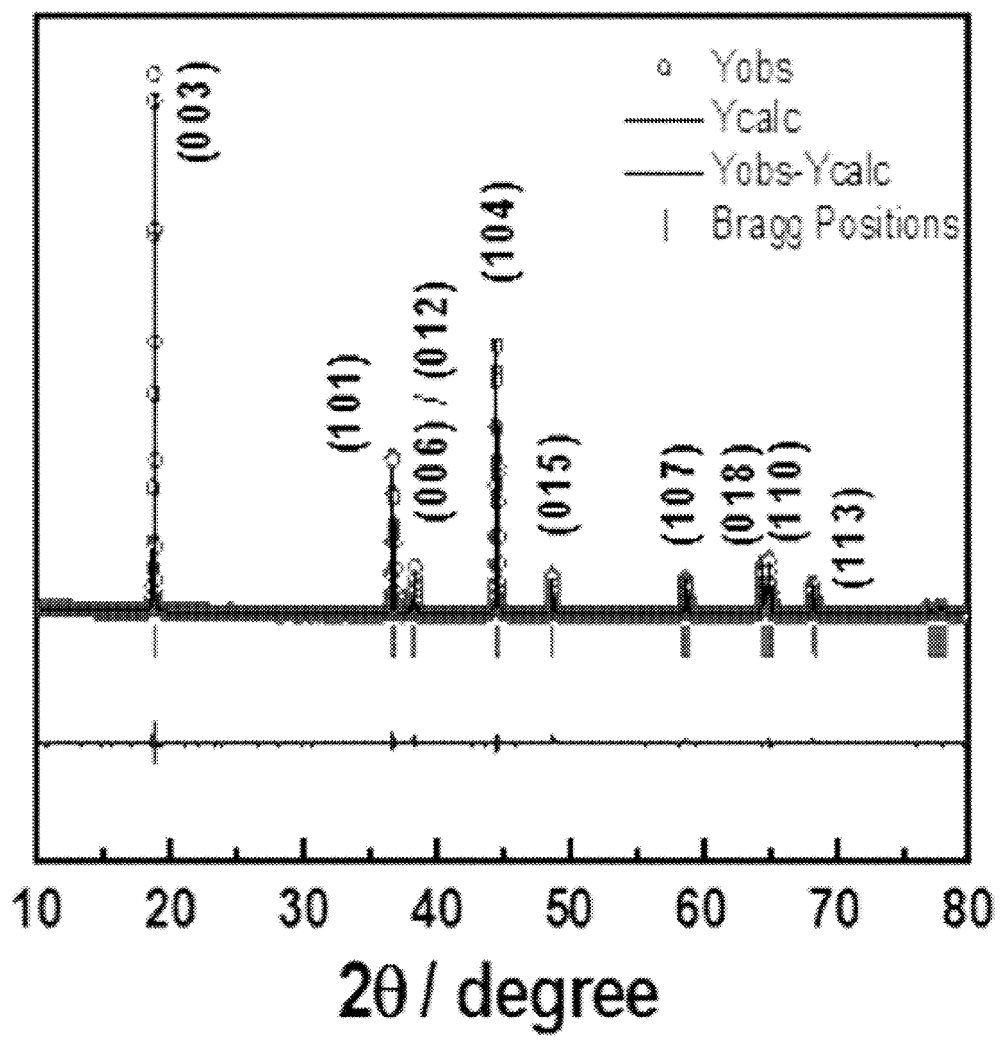
FIGS. 2A and 2B are XRD graphs of an exemplary cathode active material for an exemplary lithium secondary battery according to an exemplary embodiment of the present invention before and after coating.
Figure 2B:
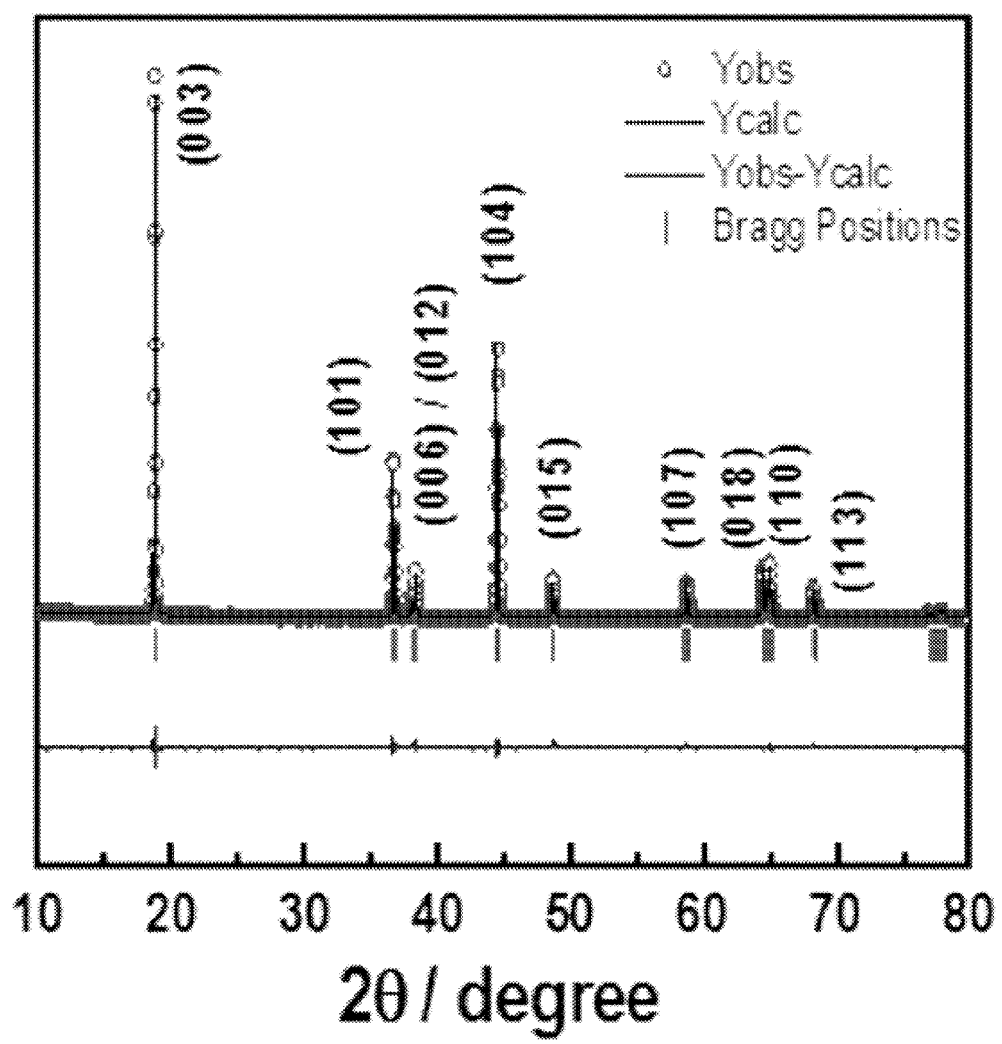

FIGS. 2A and 2B are XRD graphs of cathode active materials prepared according to Comparative Example 1 and Example 1 respectively corresponding to a cathode active material for a lithium secondary battery according to exemplary embodiments of the present invention before and after coating. Table 1 below shows a-axis and c-axis lattice constants and volumes of the cathode active materials according to Comparative Example 1 and Example 1 with reference to FIGS. 2A and 2B.

TABLE 1

| Space group $R^3m$ | a-axis lattice constant (Å) | c-axis lattice constant (Å) | V (Å$^3$) |
|---|---|---|---|
| Comparative Example 1 | 2.87105(8) | 14.1954(4) | 101.335(5) |
| Example 1 | 2.87189(7) | 14.1973(3) | 101.408(4) |

As shown in Table 1, compared with Comparative Example 1, the cathode active material according to Example 1 had almost no changes in a-axis and c-axis lattice constants and volumes, and thus it can be seen that copper sulfide (CuS) formed the coating layer well on the inner grain boundaries of the core without structural distortion of the core.

Figure 3A:
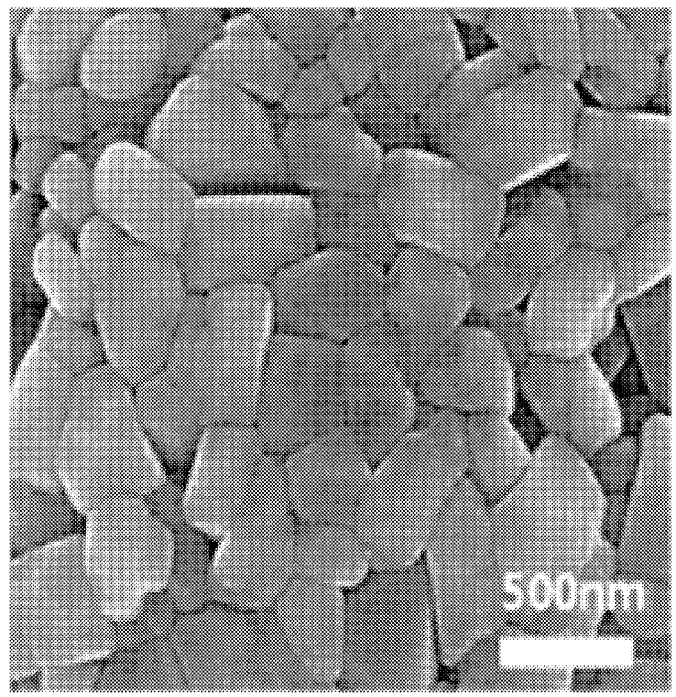
FIGS. 3A and 3B are SEM-EDX surface analysis photographs of an exemplary cathode active material for an exemplary lithium secondary battery according to an exemplary embodiment of the present invention before and after coating.
Figure 3A:
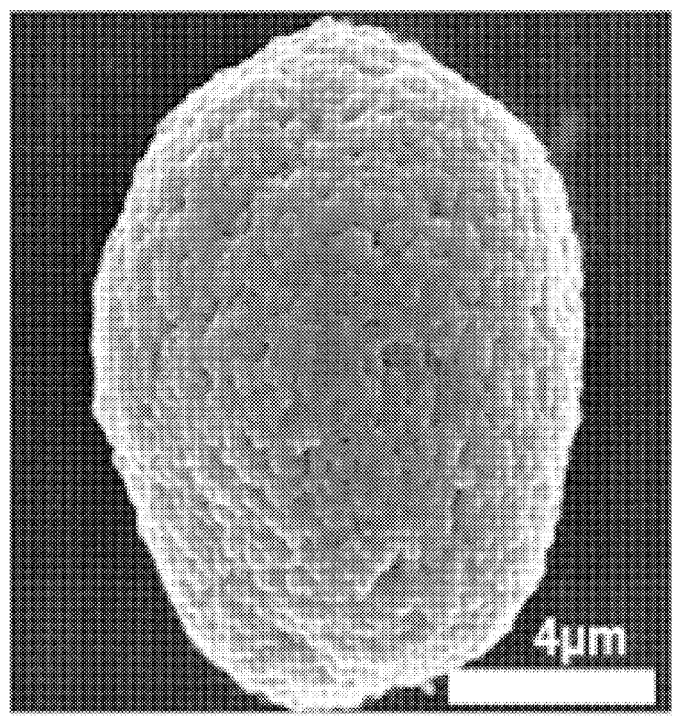
Figure 3B:
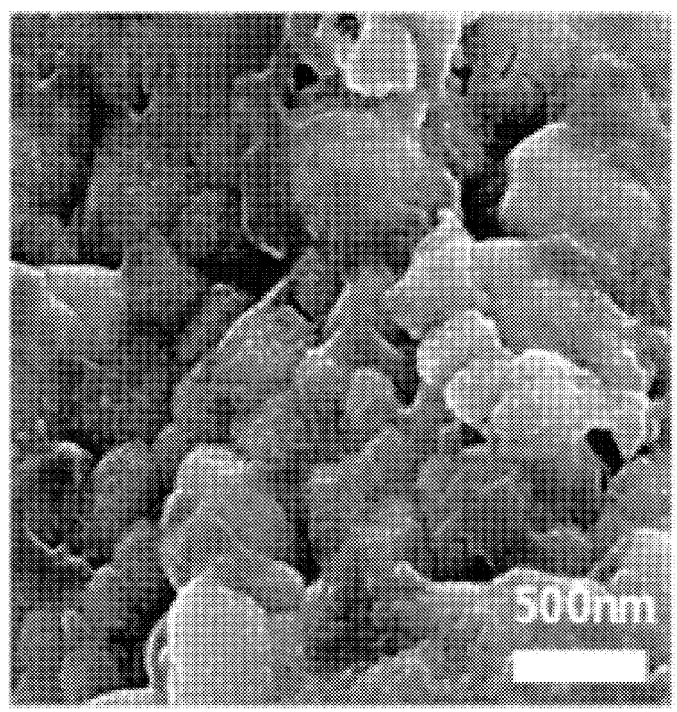
Figure 3B:
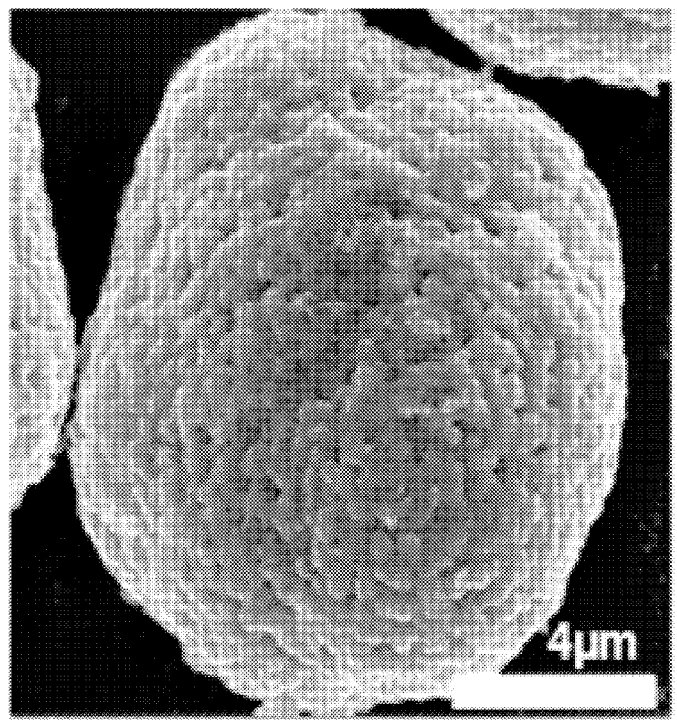

FIGS. 3A and 3B are SEM-EDX surface analysis photographs of cathode active materials for lithium secondary batteries prepared according to Comparative Example 1 and Example 1 respectively corresponding to a cathode active material for a lithium secondary battery according to the present invention before and after coating.

As shown in FIGS. 3A and 3B, in the process of coating the core with the metal sulfide, the spherical shape of the core before coating was maintained well after the coating, and thus it can be seen that core particles were not damaged and copper sulfide (CuS) was uniformly coated on the core.

(2) Evaluation of the Cell Performance with or without Coating Layer

Cell performance with or without a coating layer was evaluated with respect to Example 1 and Comparative Example 1.

Figure 4B:
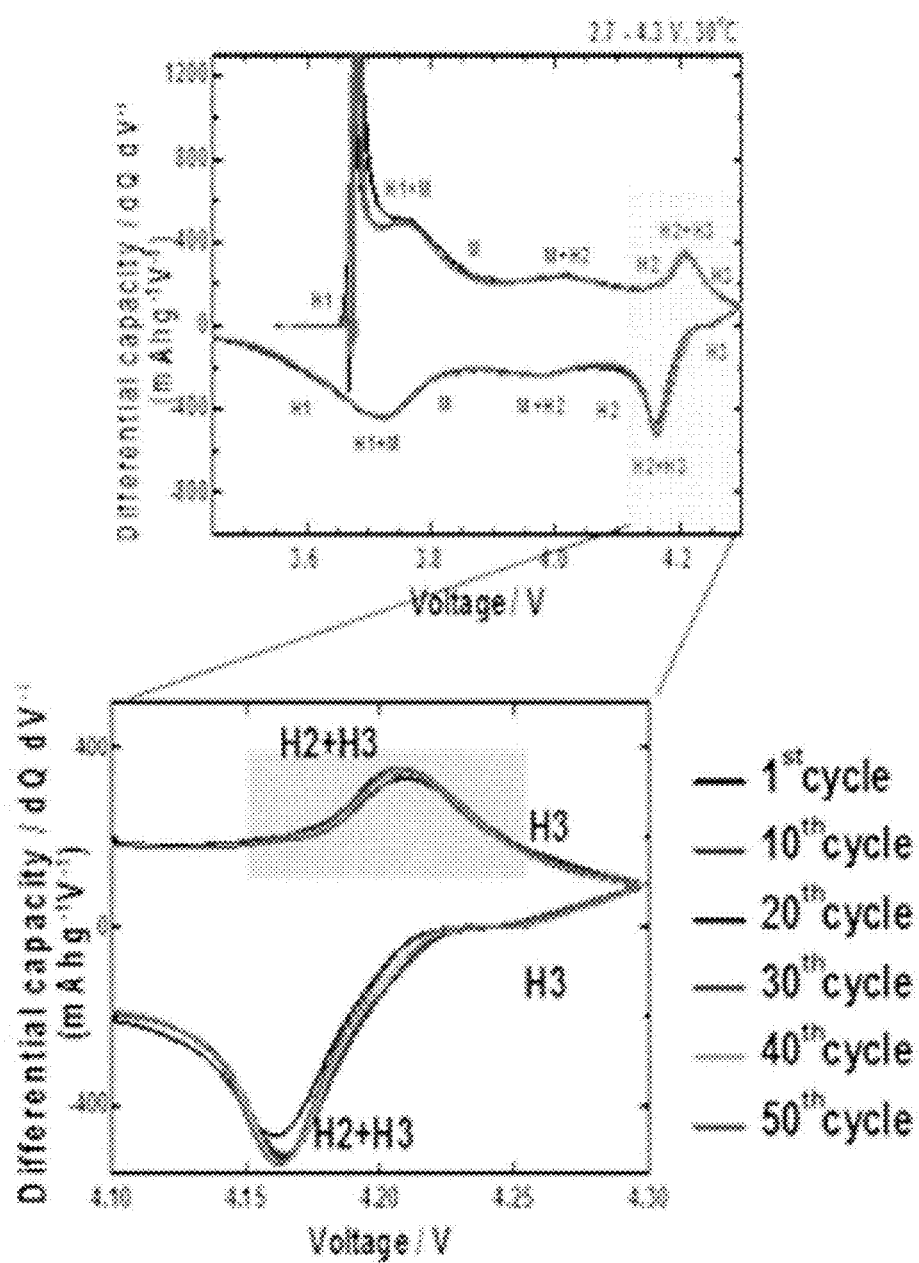
Figure 4C:
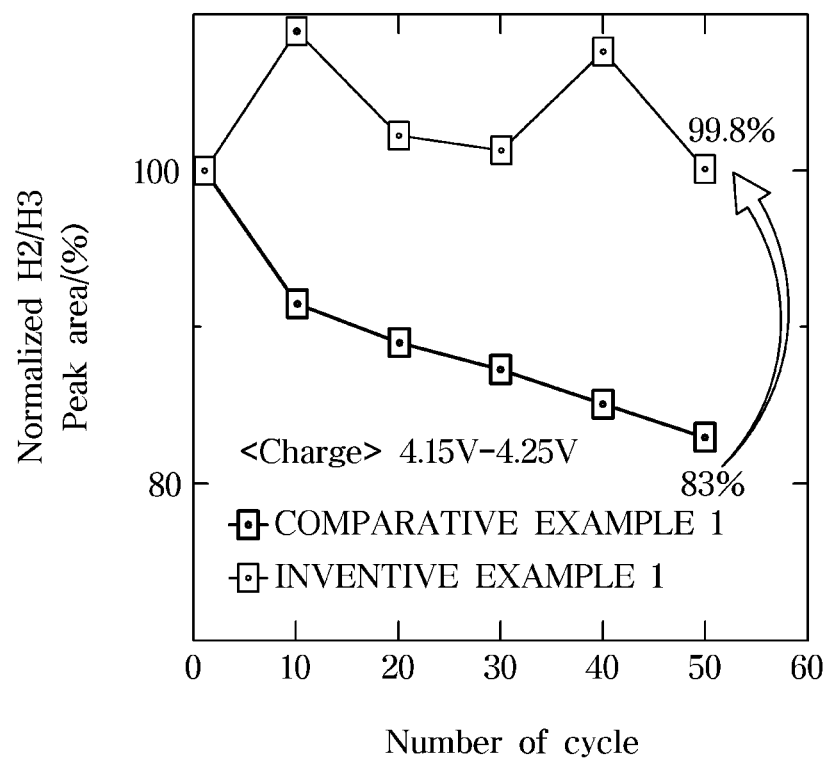

FIGS. 4A, 4B and 4C are graphs showing cell performance measured in the presence and absence of a coating layer. FIGS. 4A and 4B are graphs of dQ dV$^{-1}$ curves. A graph showing an enlarged view of the H2/H3 phase section of the whole section is shown below the graph of the entire section dQ dV$^{-1}$ curve. FIG. 4C is a graph showing the integrated area of the dotted area in the enlarged graph of the enlarged H2/H3 phase section of FIGS. 4A and 4B as a retention ratio (%) with respect to the number of cycles compared to the 1$^{st}$ cycle.

As shown in FIG. 4C, the retention ratio of Comparative Example 1 continuously decreased as the number of cycles increased and was 83% at the 50$^{th}$ cycle. However, the retention ratio of Example 1 was well maintained as the number of cycles increased, and the retention ratio was maintained as 99.8% at the 50$^{th}$ cycle, which was about 17% difference as compared with that of Comparative Example 1.

Thus, it can be seen that the structural change of the cathode active material having a coating layer according to Example 1 stably progressed during the charging and discharging process compared with Comparative Example 1. It can be also seen that the coating layer of the present invention suppressed side reactions between the core and the electrolyte well.

Figure 5:
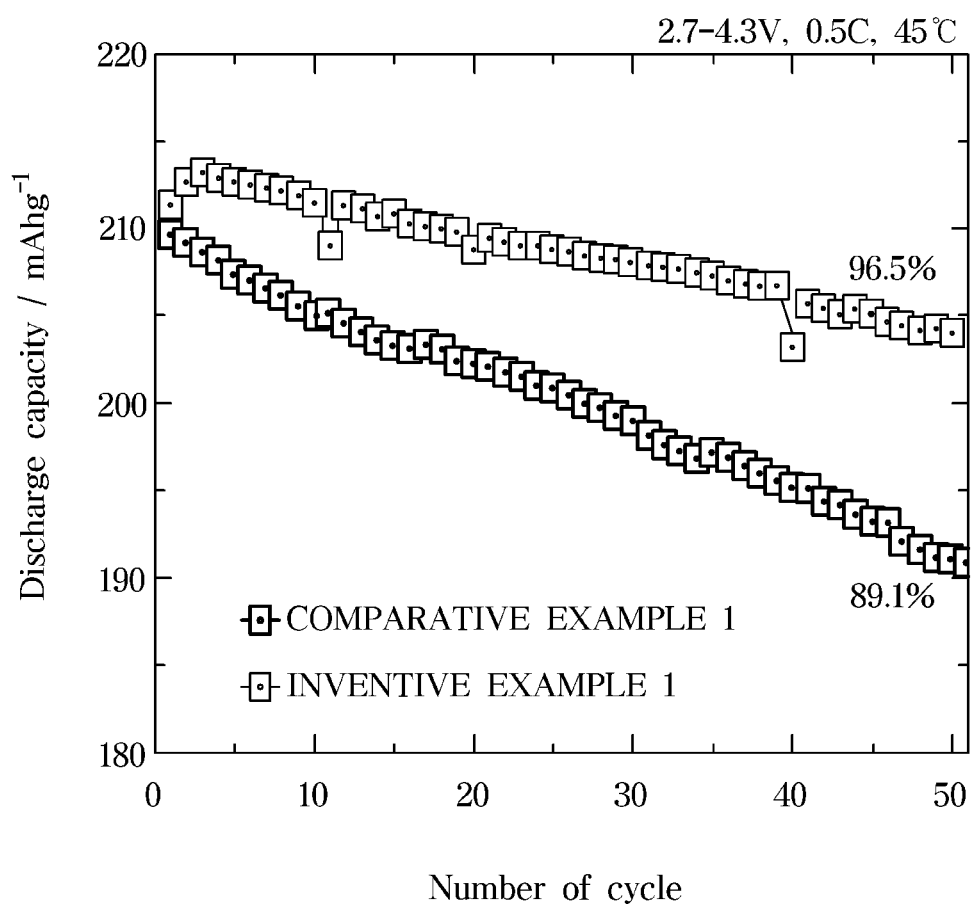
FIG. 5 is a graph showing cell performance measured at a high temperature (45° C.) in the presence and absence of an exemplary coating layer.

FIG. 5 is a graph showing cell performance measured at a high temperature (45° C.) in the presence and absence of a coating layer.

As shown in FIG. 5, the discharge capacity (mAh/g) of Comparative Example 1 decreased according to the number of cycles and was 89.1% at the 50$^{th}$ cycle. On the other hand, the discharge capacity of Example 1 was maintained relatively well although the discharge capacity was decreased according to the number of cycles and was well maintained as 96.5% at the 50$^{th}$ cycle compared with Comparative Example 1.

Figure 6:
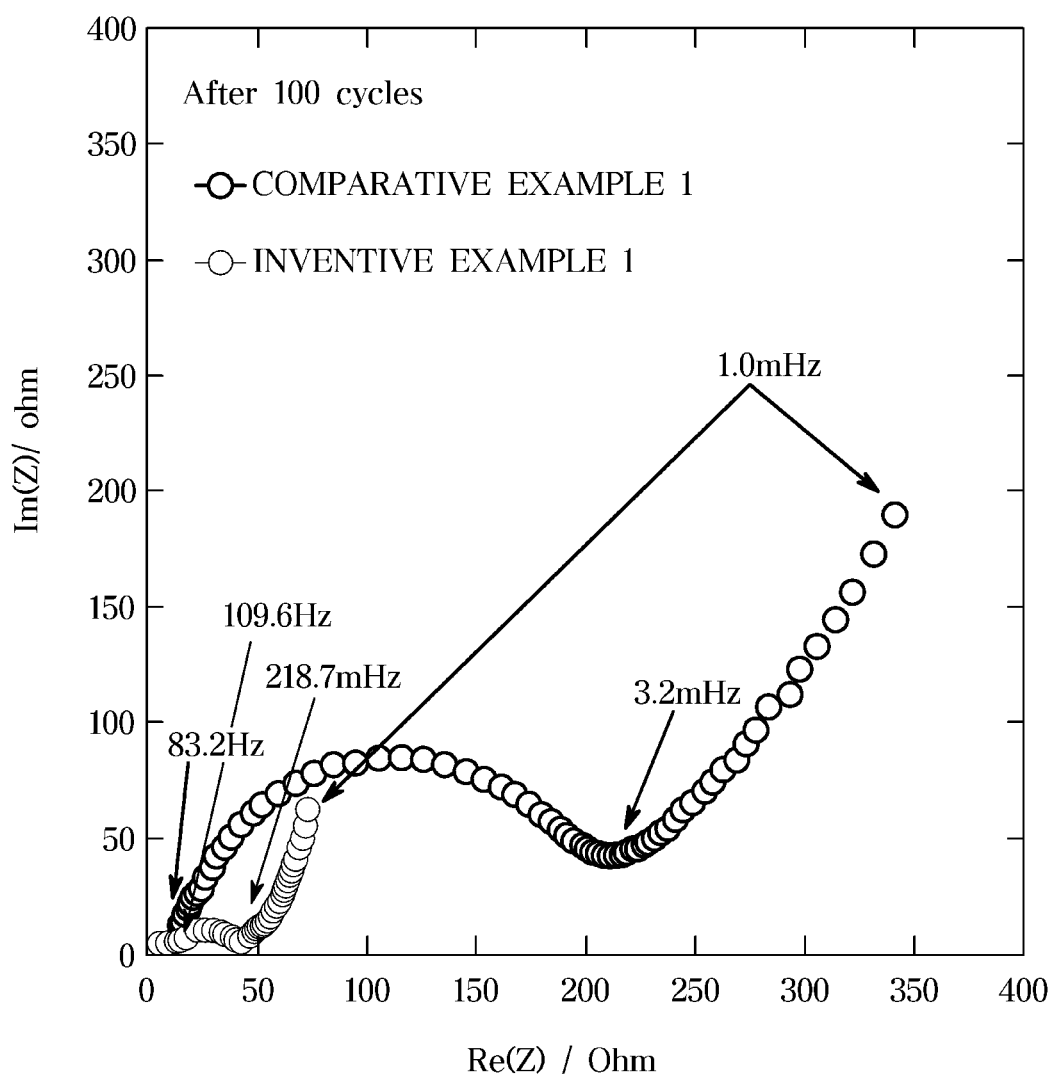
FIG. 6 is a graph showing EIS (electrochemical impedance spectroscopy) after $50^{th}$ cycle at a a high temperature (45° C.) in the presence and absence of a coating layer.

FIG. 6 is a graph showing EIS after 50$^h$ cycle at a high temperature (45° C.), with or without a coating layer. The graph of FIG. 6 shows the EIS measured by collecting the cell after the 50$^{th}$ cycle of FIG. 5 and charging the cell with 0.5 C.

Accordingly, a resistance of Example 1 was $R_{CT}$ 28.52Ω, and a resistance of Comparative Example 1 was $R_{CT}$ 197.47Ω, which was 7 times as large as that of Example 1. Because, no coating layer was formed in Comparative Example 1, cracks were generated due to a sudden change of the lattice due to phase change in repetitive charging and discharging processes, and the electrolyte penetrated into the cracks to increase surface area, and thus the surface was deteriorated to increase the resistance.

Figure 7A:
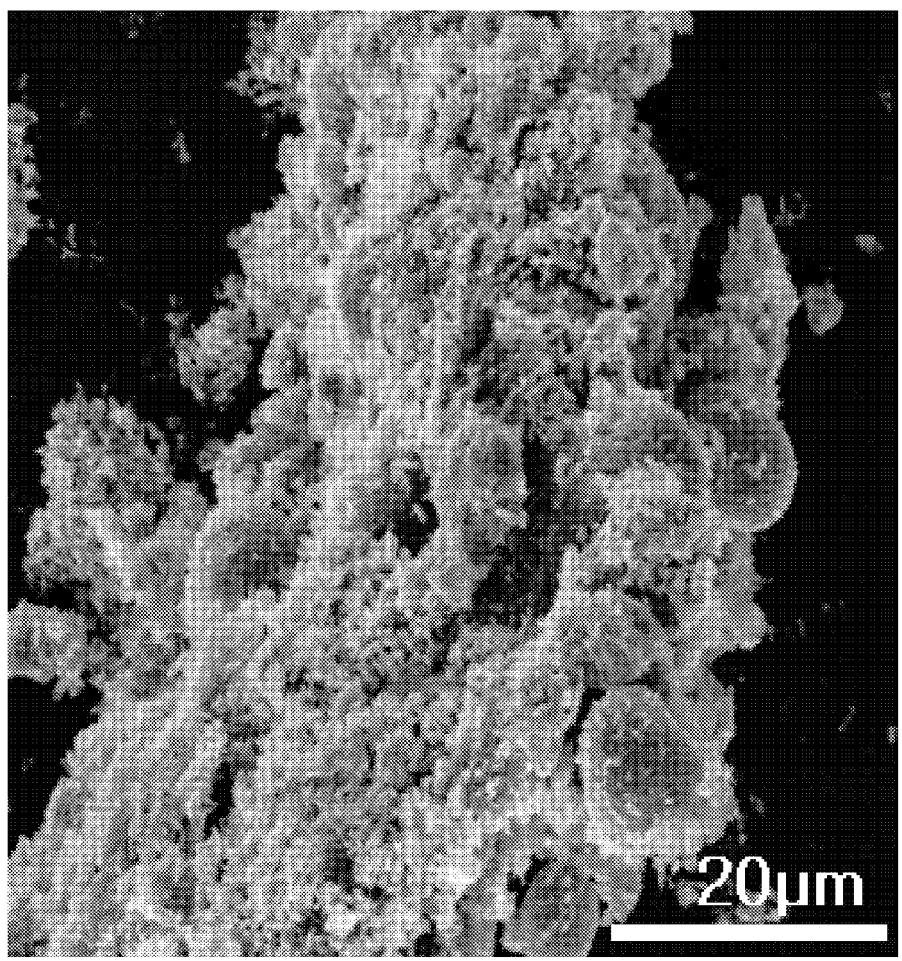
FIGS. 7A and 7B are SEM images after $50^{th}$ cycle at a high temperature (45° C.) in the presence and absence of an exemplary coating layer.
Figure 7B:
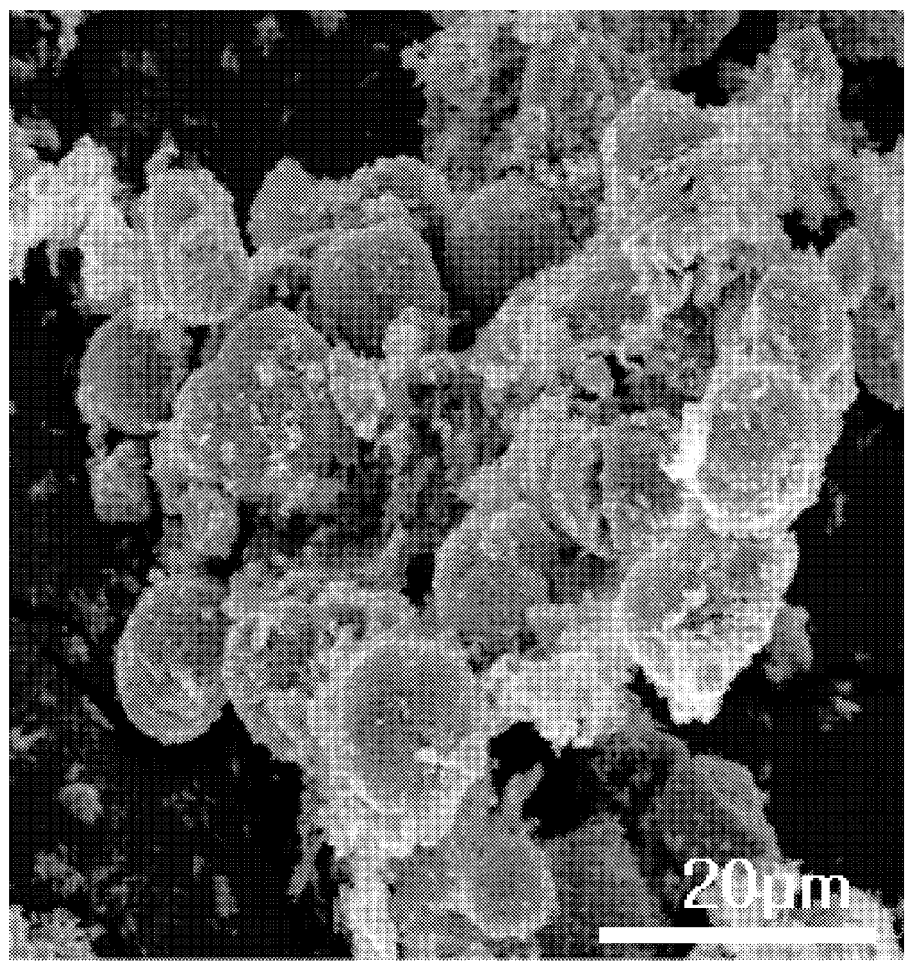

FIGS. 7A and 7B are SEM images after 50$^{th}$ cycle at a high temperature (45° C.) in the presence and absence of a coating layer. Referring to FIGS. 7A and 7B, it can be seen that the original spherical shape of Example 1 was well maintained indicating less surface deterioration compared to Comparative Example 1.

Thus, it can be seen that formation of the coating layer as in the case of Example 1 may suppress side reactions between the core and the electrolyte penetrating into the core along the grain boundaries and the cracks, thereby securing excellent lifetime characteristics.

As described above, as shown in FIGS. 4 to 7, it can be seen that excellent lifetime characteristics may be secured by forming the coating layer on the surface and the inner grain boundaries of the core as in the present invention.

(3) Evaluation of Cell Performance According to Heat Treatment Conditions

Figure 8:
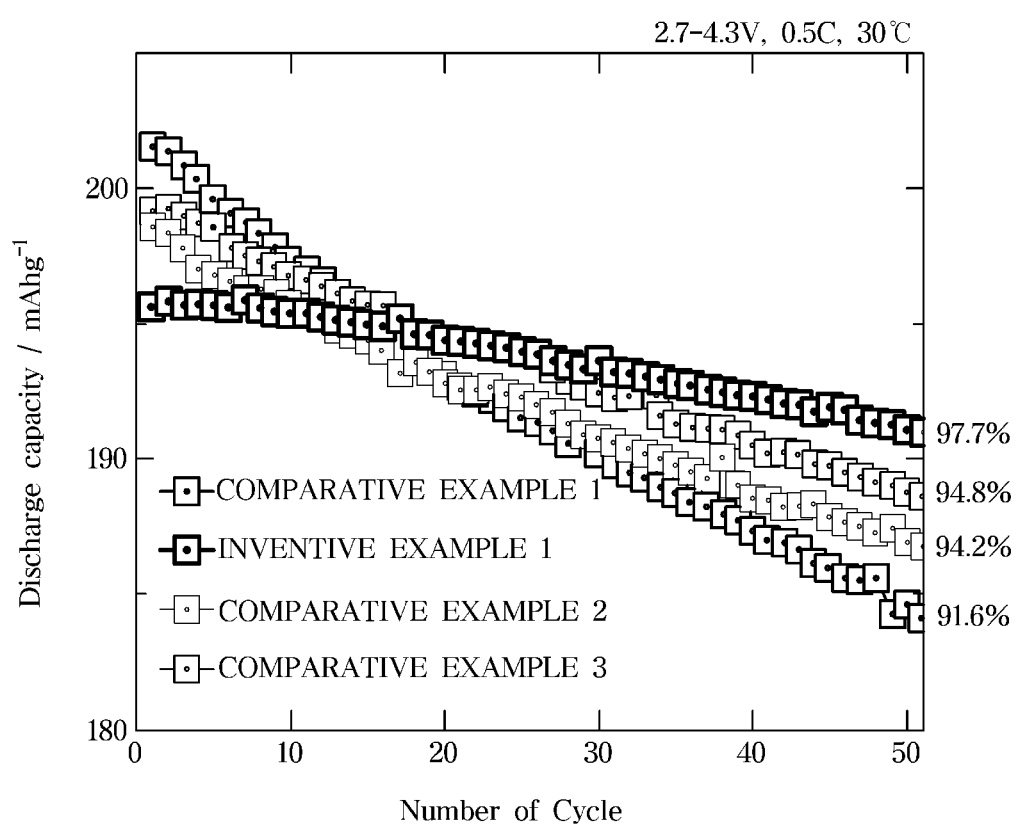
FIG. 8 is a graph showing cell performance according to heat treatment temperature according to an exemplary embodiment of the present invention.

FIG. 8 is a graph showing cell performance according to a heat treatment temperature for forming a coating layer. In FIG. 8, performance of cells prepared using the cathode active materials according to Example 1 and Comparative Examples 1 to 3 was measured at a temperature of 30° C. The heat treatment conditions for Example 1 and Comparative Examples 1 to 3 were set to temperatures (400° C., 500° C., 550° C.) respectively in consideration of the fact that the melting point of copper sulfide (CuS) was 500° C.

The measurement results of FIG. 8 are shown in Table 2 below.

TABLE 2

| Sample | Heat treatment Temperature (° C.) | 0.5 C, 1st Discharge Capacity (mAh/g) | 0.5 C, 50th Capacity Retention Ratio (%) |
|---|---|---|---|
| Example 1 | 400 | 195.6 | 97.7 |
| Comparative Example 1 | — | 201.5 | 91.6 |
| Comparative Example 2 | 500 | 198.5 | 94.2 |
| Comparative Example 3 | 550 | 199.1 | 94.8 |

In the case of Comparative Example 1 in which no coating layer was formed, the capacity retention ratio after the 50th cycle was 91.6%, which was lower than that those of Example 1 and Comparative Examples 2 and 3 in which the coating layer was formed. It can be seen that excellent lifetime characteristics may be secured by forming a coating layer therefrom.

As comparing Example 1 and Comparative Examples 2 and 3, which were heat-treated at different temperatures, Example 1 heat-treated at a temperature of 350 to 450° C. exhibited a capacity retention rate of 97.7% which was the optimum lifetime characteristics.

(4) Evaluation of Cell Performance According to Mol % of Metal Sulfide

Figure 9:
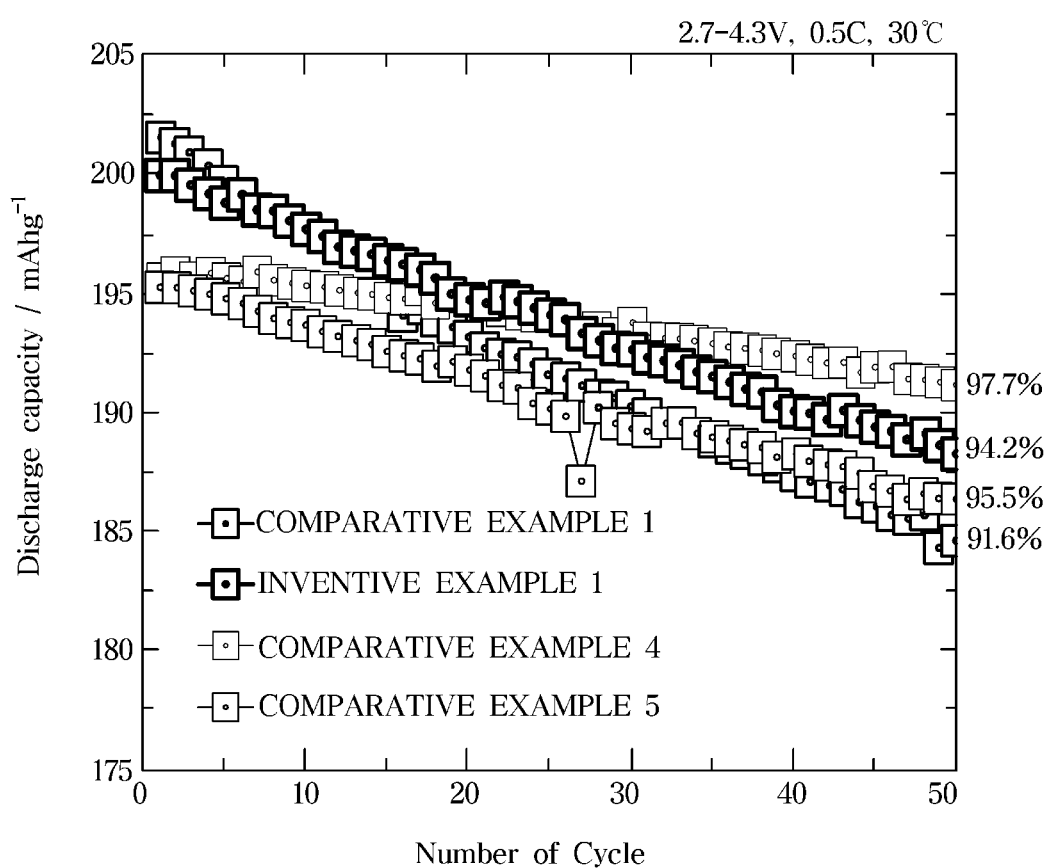
FIG. 9 is a graph showing cell performance measured according to mol % of an exemplary metal sulfide according to an exemplary embodiment of the present invention.

FIG. 9 is a graph showing cell performance measured according to mol % of metal sulfide. In FIG. 9, cell performance according to Example 1 and Comparative Examples 1, 4, and 5 was measured at a temperature of 30° C.

The measurement results of FIG. 9 are shown in Table 3 below.

TABLE 3

| Sample | CuS (mol %) | 0.5 C, 1st Discharge Capacity (mAh/g) | 0.5 C, 50th Capacity Retention Ratio (%) |
|---|---|---|---|
| Example 1 | 1 | 195.6 | 97.7 |
| Comparative Example 1 | — | 201.5 | 91.6 |
| Comparative Example 4 | 0.5 | 199.9 | 94.2 |
| Comparative Example 5 | 2 | 195.2 | 95.5 |

In the case of Comparative Example 1 in which the coating layer was not formed, the capacity retention ratio after the 50th cycle was 91.6%, which was lower than those of Example 1 and Comparative Examples 4 and 5 in which the coating layer was formed. It can be seen that excellent lifetime characteristics may be secured by forming a coating layer therefrom.

By comparing Example 1 and Comparative Examples 4 and 5 including different mol % of the metal sulfide, Example 1 including 1 mol % of the metal sulfide showed the highest capacity retention ratio of 97.7%. On the other hand, Comparative Example 4 including a small amount (0.5 mol %) of the metal sulfide showed a capacity retention ratio of 94.2% because the coating area of the core was narrow and the side reaction between the core and the electrolyte was not sufficiently suppressed. Comparative Example 5 including an excessive amount (2 mol %) of the metal sulfide was able to inhibit reversible intercalation and deintercalation of lithium, and the capacity retention was 95.5% due to saturation of the coating effect.

Therefore, it can be seen that the metal sulfide is preferably contained in an amount of about 0.5 to 2 mol %, more preferably about 1 mol %, based on the total mol number of the cathode active material, to obtain excellent lifetime characteristics.

The exemplary embodiments disclosed with reference to the accompanying drawings and tables have been described above. It will be understood by those of ordinary skill in the art that various changes in form and details may be made therein without departing from the idea and scope of the present invention as defined by the following claims. The exemplary embodiments are illustrative and should not be construed as limiting.

What is claimed is:

1. A cathode active material for a lithium secondary battery comprising:
    a core comprising a lithium metal oxide; and
    a coating layer formed on a surface and inner grain boundaries of the core;
    wherein the coating layer comprises a metal sulfide,
    wherein the coating layer comprises the metal sulfide in an amount of 0.5 to 2 mol % based on the total mol number of the cathode active material,
    wherein the metal sulfide comprises Cu,
    wherein the lithium metal oxide comprises one or more selected from the group consisting of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_{60}$ (where $0.95 \leq x \leq 1.1$, $0 \leq y \leq 0.5$, $0 \leq z \leq 0.5$, and $0 < \alpha \leq 2$),
    wherein, M' is at least one element selected from the group consisting of Al, Ni, Co, Mn, Cr, Fe, Mg, Sr, V, Ru, Sn, Ti, As, Mo or a rare earth element, A is an element selected from the group consisting of O, F, S and P, and X is an element selected from the group consisting of F, S and P.

2. The cathode active material of claim 1, wherein the cathode active material has a particle size of about 3 to 20 μm.

3. A lithium secondary battery, comprising:
    a cathode comprising a cathode active material comprising i) a core comprising a lithium metal oxide and ii) a coating layer formed on a surface and inner boundaries of the core, wherein the coating layer comprises a metal sulfide;
    wherein the coating layer comprises the metal sulfide in an amount of 0.5 to 2 mol % based on the total mol number of the cathode active material, wherein the metal sulfide comprises Cu;
    an anode; and
    an electrolyte,
    wherein the lithium metal oxide comprises one or more selected from the group consisting of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ (where $0.95 \leq x \leq 1.1$, $0 \leq y \leq 0.5$, and $0 < \alpha \leq 2$),
    wherein, M' is at least one element selected from the group consisting of Al, Ni, Co, Mn, Cr, Fe, Mg, Sr, V, Ru, Sn, Ti, As, Mo or a rare earth element, A is an element selected from the group consisting of O, F, S and P, and X is an element selected from the group consisting of F, S and P.

4. A method of manufacturing a cathode active material for a lithium secondary battery of claim 1, comprising:
preparing an admixture comprising the metal sulfide and the core comprising the lithium metal oxide; and
forming the coating layer on a surface and inner grain boundaries of the core by heating the admixture.

5. The method of claim 4, wherein the admixture is prepared by dry mixing the metal sulfide and the core comprising the lithium metal oxide.

6. The method of claim 5, wherein the dry mixing comprises at least one selected from the group consisting of a planetary ball mill method, a ball mill method, a hybridization method and a mechanofusion method.

7. The method of claim 4, wherein the heating is performed at a temperature of about 350 to 450° C.

8. The method of claim 4, wherein the admixture is formed to have a particle size of about 3 to 20 μm.

\* \* \* \* \*